(12) United States Patent
Hover

(10) Patent No.: US 7,065,531 B2
(45) Date of Patent: Jun. 20, 2006

(54) COMBINING COMPUTER PROGRAMS

(75) Inventor: John W. Hover, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 484 days.

(21) Appl. No.: 10/094,646

(22) Filed: Mar. 12, 2002

(65) Prior Publication Data

US 2003/0177144 A1    Sep. 18, 2003

(51) Int. Cl.
*G06F 17/30* (2006.01)

(52) U.S. Cl. .......................... 707/102; 717/120; 713/2

(58) Field of Classification Search ............... 711/173, 711/100, 10; 707/205, 102; 360/53; 713/2; 717/120

See application file for complete search history.

(56) References Cited

U.S. PATENT DOCUMENTS

| | | | |
|---|---|---|---|
| 4,908,789 A * | 3/1990 | Blokkum et al. ........... 711/172 |
| 5,129,088 A * | 7/1992 | Auslander et al. ............. 711/1 |
| 5,263,148 A * | 11/1993 | Jones et al. ..................... 713/1 |
| 5,283,828 A * | 2/1994 | Saunders et al. ........... 713/192 |
| 5,473,777 A * | 12/1995 | Moeller et al. ............. 719/328 |
| 5,577,231 A * | 11/1996 | Scalzi et al. .................. 703/26 |
| 5,655,119 A * | 8/1997 | Davy .......................... 707/200 |
| 5,918,039 A * | 6/1999 | Buswell et al. ............... 703/27 |
| 5,930,831 A * | 7/1999 | Marsh et al. ................ 711/173 |
| 5,966,727 A * | 10/1999 | Nishino ...................... 711/127 |
| 6,185,575 B1 * | 2/2001 | Orcutt ......................... 707/200 |
| 6,327,652 B1 * | 12/2001 | England et al. ................ 713/2 |
| 6,385,690 B1 * | 5/2002 | Iida et al. .................... 711/103 |
| 6,499,095 B1 * | 12/2002 | Sexton et al. ............... 711/203 |
| 6,519,762 B1 * | 2/2003 | Colligan et al. ............ 717/170 |
| 6,609,199 B1 * | 8/2003 | DeTreville ................... 713/172 |
| 6,633,964 B1 * | 10/2003 | Zimmer et al. ............. 711/163 |
| 6,693,754 B1 * | 2/2004 | Noble et al. ................... 360/53 |
| 6,718,462 B1 * | 4/2004 | Griffiths et al. ................ 713/2 |
| 6,725,321 B1 * | 4/2004 | Sinclair et al. ............. 711/103 |
| 6,742,818 B1 * | 6/2004 | Seki et al. ................... 292/216 |
| 6,807,596 B1 * | 10/2004 | Erickson et al. ............ 710/301 |

* cited by examiner

*Primary Examiner*—Wayne Amsbury

(57) ABSTRACT

A file is created that includes two computer programs. The first computer program is combined with a second computer program in the file, for example, by adding the first computer program to the file and appending the second computer program to the file. A file location identifier is included in the file. The file location identifier identifies a location of a division between the first and second computer programs in the file. The file may be stored in memory, and file location identifier may be used to identify a location of one of the computer programs in the memory.

18 Claims, 4 Drawing Sheets

COMBINING COMPUTER PROGRAMS

FIELD OF THE INVENTION

The invention is generally related to computer programs. More particularly, the invention is related to combining computer programs.

BACKGROUND OF THE INVENTION

A server typically runs manageability firmware for configuring and controlling the operation of the server, and monitoring parameters such as temperatures, power status, etc. The manageability firmware usually consists of a resource file for facilitating web access to the server and a management processor user interface program (MP program) for managing the server. The resource file may include an executable file (e.g., JAVA file, and the like) that is transmitted to clients over a network. The file facilitates web access to the server from the client for managing the server from the client. The MP program may be coded in a high-level language, such as C++, and the like.

Typically, the manageability firmware is stored in a nonvolatile memory in the server, such as a read-only memory (ROM). FIG. 4 illustrates the manageability firmware stored in a nonvolatile memory 400 according to the prior art. Conventionally, the resource file is stored at a fixed location in the upper memory 410 of the memory 400, and the MP program is stored in a lower memory 420. A gap 430 of empty memory is usually provided between the resource file and the MP program for updates.

The manageability firmware may be updated frequently, especially during development (e.g., updated daily during development). Updating the firmware is at least a two-step process, regardless of whether one or both the resource file and the MP program are being updated. First, the resource file is loaded into the memory 400 at the fixed location, and then the MP program is loaded into the memory 400.

If the MP program becomes too large, however, it may require more space than the amount of memory encompassed by the gap 430. Therefore, the fixed location of the resource file must be changed to accommodate the larger MP program. This requires a programmer or network administrator to determine the size of the resource file and the MP program, and then determine a new fixed memory location for storing the resource file to allow enough space to store the MP program in the memory 400. Therefore, a significant amount of time is required for a programmer or network administrator to perform the conventional procedure for updating the manageability firmware. Furthermore, during development, when updates are performed on a regular basis, the amount of time consumed to perform the updates may delay final production and increase development costs.

SUMMARY OF THE INVENTION

An embodiment of the invention includes a method for combining computer programs. The method comprises steps of identifying a size of a first computer program; combining the first computer program and a second computer program into a single file; and including a file location identifier in the file. The file location identifier includes a location of a division between the first computer program and the second computer program in the file.

Another embodiment of the invention includes a computing device comprising a processor and a memory. The computing device is configured to store a file including two computer programs in the memory. The file includes a file location identifier locating a division between the two computer programs in the file.

Another embodiment of the invention includes a method of storing computer programs in a memory of a computing device. The method comprises steps of creating a file including a first computer program; appending a second computer program to the file; including a file location identifier in the file, the file location identifier including a location of a division between the first computer program and the second computer program in the file; and storing the file in the memory.

The methods of the present invention include steps that may be performed by computer-executable instructions executing on a computer-readable medium.

Those skilled in the art will appreciate these and other aspects of various embodiments of the invention upon reading the following detailed description of a preferred embodiment with reference to the below-listed drawings.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
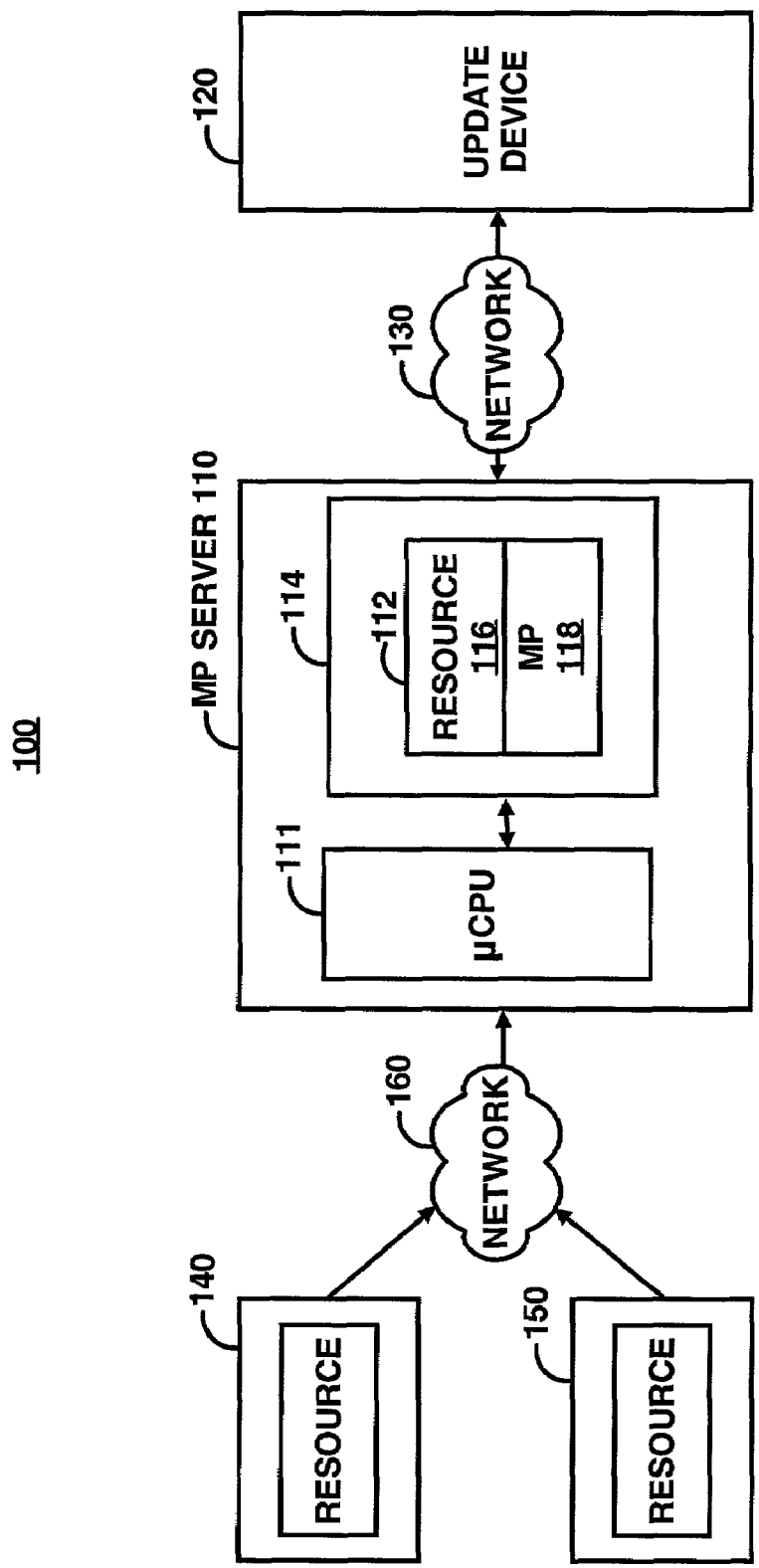
FIG. 1 illustrates an exemplary system according to an embodiment of the invention.

FIG. 1 illustrates an exemplary system 100 according to an embodiment of the invention. The system 100 includes a computing device 110 (also called an MP server) connected to an update device 120 via a network 130. The MP server 110 is also connected to remote computing devices 140 and 150 via a network 160. The MP server 110 includes manageability firmware 112 stored in a memory 114. The manageability firmware 112 includes a resource program 116 and an MP program 118. A processor 111 may be connected to the memory 114 and is configured to run the MP program 118 for managing the MP server 110.

The MP program 118 is for configuring and controlling the operation of the server, and monitoring parameters such as temperatures, power status, etc. The MP program 118 may be coded in a high-level language, such as C++, and the like. The resource program 116 facilitates remote access to the MP server 110 and the MP program 118. The resource program 116 may include an executable file (e.g., JAVA file, and the like) that is transmitted to the remote computing devices 140 and 150 over the network 160.

The MP server 110, the update device 120, and the remote computing devices 140 and 150 may include servers, personal computers, personal digital assistants, or any device with a processor operable to execute computer programs. The MP server 110, for example, may be a computing device other than a server. In a preferred embodiment, the MP server 110 includes a server that is monitored and controlled using the MP program 118. The remote devices 140 and 150 are clients connected to the MP server 110 via the network 160. The network 160 and the network 130 may include one or more networks (e.g., LAN, WAN, Internet, private networks, etc.). Furthermore, the number of remote computing devices connected to the MP server 110 may include one or a plurality. The resource program 116 may be transmitted to the remote computing devices 140 and 150 to facilitate remote access to the MP server 110 to run the MP program 112. Alternatively, a user may interact with the MP program 118 at the MP server 110 using, for example, an input device and a monitor connected to the MP server 110 or by connecting a remote computing device directly to the MP server 110 via a port.

The MP server 110 is also connected to an update device 120. The update device 120 may transmit computer programs to the MP server 110. The computer programs may include new versions of the MP program 118 and the resource program 116. The MP server 110 receives the programs and installs them in the memory 114. The memory 114 may include RAM, ROM, hard drive or any conventional memory device. In the preferred embodiment, the MP program 118 and the resource program 116, which may be downloaded from the update device 120, are stored in a non-volatile memory.

The manageability firmware 112 includes a single file (e.g., a firmware update file) stored in the memory 114. The firmware update file, for example, may be downloaded from the update device 120.

The MP program 118 and the resource program 116 are combined into the firmware update file and then stored in the memory 114. For example, the firmware update file is created and the MP program 118 is added to the file. The resource file 116 may then be appended to the firmware update file. This file may then be stored in the memory 114 starting at a fixed memory location. The firmware update file also includes a file location identifier for identifying the division between the MP program 118 and the resource program 116. The MP program 118 may use the file location identifier to locate the resource program 116 in the memory 114. Then, the MP program may retrieve the resource program 116 from the memory 114, and transmit it to, for example, the remote computing devices 140 and 150. Using a single file to store the manageability firmware 112 eliminates the need to manually determine the size of the MP program 118 and the resource program 116 and eliminates the need to calculate the amount of space needed to store the manageability firmware in the memory 114.

Figure 2:
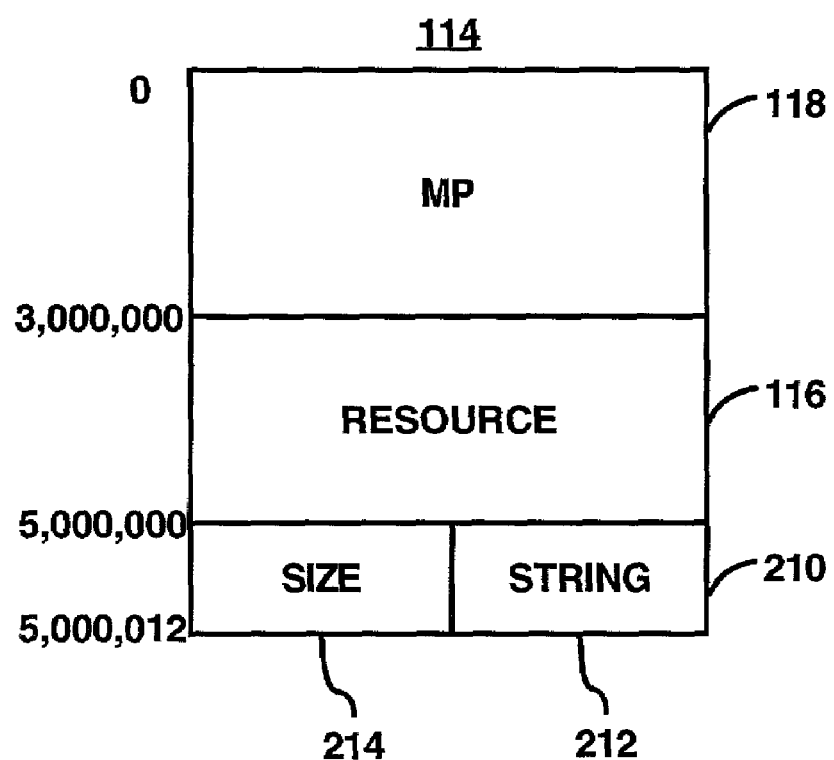
FIG. 2 illustrates a memory storing manageability firmware according to an embodiment of the invention.

FIG. 2 illustrates the memory 114 storing the manageability firmware 112. The manageability firmware 112 is stored as a single file (e.g., the firmware update file) in the memory 114, and utilizes a substantially continuous set of memory locations. Therefore, the memory 114 is efficiently utilized. For example, the MP program 118 is stored starting at a fixed location in the memory 114, such as in the first 3,000,000 bytes, and the resource program 116 is stored in the next 2,000,000 bytes in the memory 114. A file location identifier 210 included in the firmware update file is stored in the memory 114 preferably at the end of the firmware update file. The file location identifier 210 may include a string 212, identifiable by a computer program, and the size 214 of the MP program 118. The MP program 118 may search the memory 114 for the string 212. The MP program 118 locates the size 214 (e.g., 3,000,000 bytes) of the MP program 118, because the size is located at a predetermined location relative to the string. From the size 214 (e.g., 3,000,000 bytes), the MP program 118 determines that the resource program 116 is stored at byte 3,000,001 in the memory 114. The length of the file location identifier 210 is shown as twelve bytes; however, the length may be varied without departing from the scope of the invention.

Figure 3:
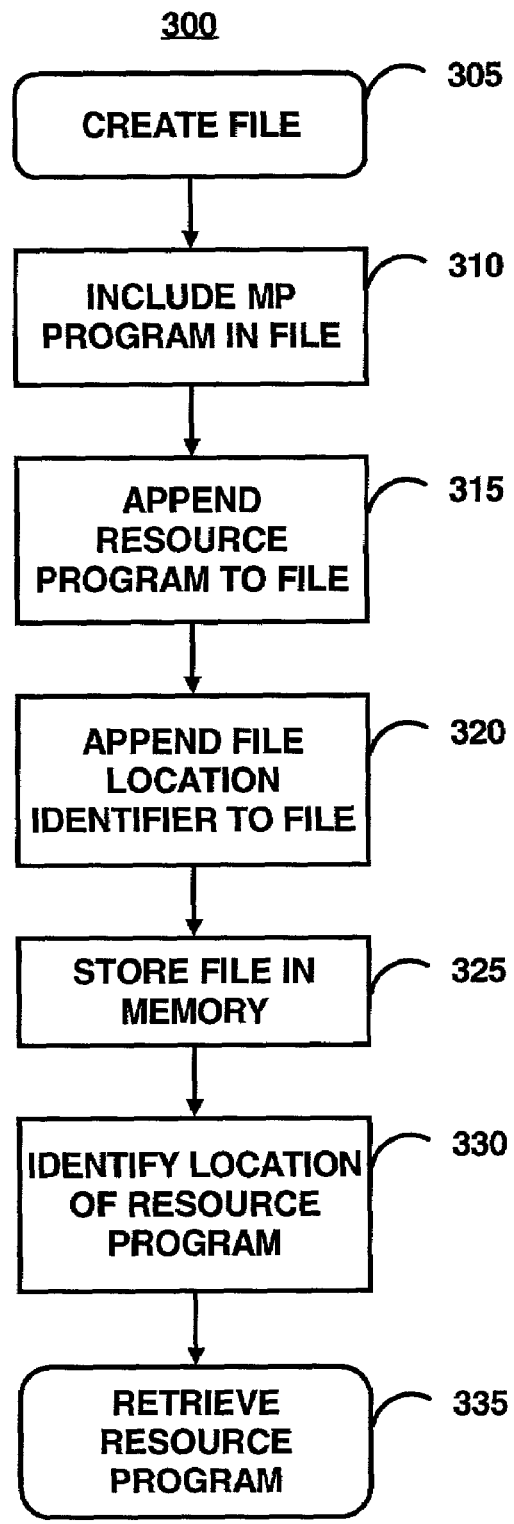
FIG. 3 illustrates a flowchart of a method according to an embodiment of the invention.
Figure 4:
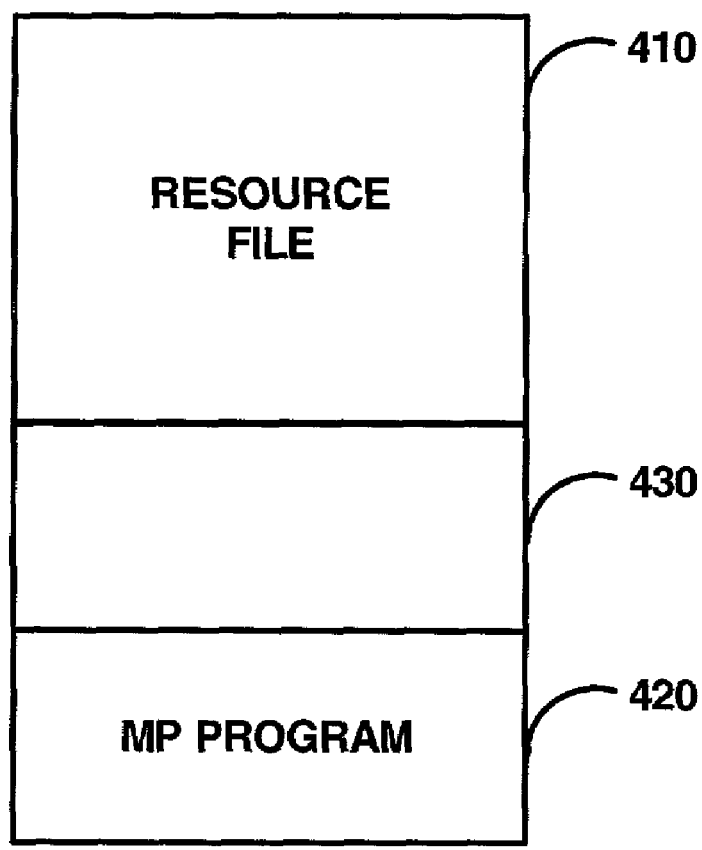
FIG. 4 illustrates a memory storing manageability firmware according to the prior art.

FIG. 3 illustrates an exemplary method 300 of a preferred embodiment of the invention. In step 305, a file (e.g., the firmware update file) is created. In step 310, the MP program 118 is included in the file. In step 315, the resource program 116 is appended to the end of the file. In step 320, the file location identifier 210 is appended to the end of the file. In step 325, the file is stored in the memory 114 at a fixed memory location. For example, the file is downloaded from the update device 120 and stored in a fixed memory location in the memory 114. The steps 305–325 may be performed by the processor 111 shown in FIG. 1.

In step 330, the MP program 118 identifies the location of the resource program, 116 stored in the memory 114 based on the file location identifier. For example, the processor 111 runs the MP program 118. The MP program 118 may search the memory 114 for the string 212 and the retrieve the size (e.g., 3,000,000 bytes) of the MP program 118. The MP program 118 may then determine that the resource program 116 is stored at byte 3,000,001 in the memory 114.

In step 335, the MP program 118 retrieves the resource program 116 from the memory 114 using the identified location. In step 340, the MP program 118 transmits the resource program 116 to remote computing devices.

Certain steps of the method 300 can be performed by a computer program. That is, the generation of the file including the MP program 118 and the resource program 116 and the steps for retrieving the resource program 116 can be performed by a computer program. The computer program can exist in a variety of forms both active and inactive. For example, the computer program and objects can exist as software comprised of program instructions or statements in source code, object code, executable code or other formats; or firmware program(s). Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A method of combining computer programs, the method comprising steps of:
   combining a first computer program and a second computer program into a single file;
   including a file location identifier in the tile, the file location identifier including a size of the first computer program and a string identifiable by a computer program, wherein the size is operable to be used to locate a division between the first computer program and the second computer program in the file,
   wherein the first computer program uses the file location identifier to locate the second program in the storage device;
   storing the file in a storage device;
   locating the file location identifier by identifying the string in the single file;
   determining the size of the first computer program from the file location identifier; and
   determining the location of the division between the first computer program and the second computer program in the single file based on the size of the first computer program.

2. The method of claim 1, where the step of combining further comprises steps of:
   creating the single tile including the first computer program; and
   appending the second computer program to the single tile after the first program.

3. The method of claim 1, wherein the storage device comprises a memory.

4. The method of claim 3, further comprising identifying a location of the second computer program in the memory using the file location identifier.

5. The method of claim 4, wherein the step of identifying further comprises steps of:
   converting the file location identifier into a memory address; and
   using the memory address to determine a location of the second computer program in the memory.

6. The method of claim 4, wherein storing the file in memory further comprises:
   storing the file in a contiguous set of memory locations, the substantially contiguous set of memory locations Including a consecutive set of memory locations in the memory.

7. The method of claim 1, wherein the single file comprises manageability firmware.

8. The method of claim 7, wherein the first computer program includes a processor management program and the second computer program includes a resource program for facilitating access to the management program through a network.

9. The method of claim 1, further comprising a step of updating a ROM with the single file.

10. A computing device comprising:
    a processor and a memory,
    wherein the computing device stores a file including two computer programs in the memory,
    the file including a file location identifier operable to be used to locate a division between the two computer programs in the file;
    wherein the file location identifier includes a size of a first computer program of the two computer programs and a string identifiable by a computer program,
    wherein the file location identifier is identifiable by the string in the file, the size of the first computer program is determinable from to file location identifier, and the location of the division between the first computer program and a second computer program of the two computer programs in the file is determinable based onto size of to first computer program identified from to file location identifier; and
    wherein the file is stored in a contiguous set of memory locations in the memory, the contiguous set of memory locations including a consecutive set of memory locations in the memory.

11. The computing device of claim 10, wherein the computing device is connected to a remote computing device through a network, and the computing device is configured to receive the file from the remote computing device over the network.

12. The computing device of claim 11, wherein the computing device comprises a server.

13. The computing device of claim 12, wherein the file includes manageability firmware.

14. The computing device of claim 13, wherein the two computer programs include a resource program and a management processor interface program, and the processor runs the management processor interface program for managing server maintenance functions.

15. The computing device of claim 14, wherein the resource program facilitates access to the server aver the Internet from a client device.

16. A method of storing computer programs in a memory of a computing device, the method comprising steps of:
    creating a file including a first computer program;
    appending a second computer program to the file;
    including a, file location identifier in the file, the file location identifier including a location of a division between the first computer program and the second computer program in the file,
    wherein the file location identifier includes a size of the first computer program and a string identifiable by a computer program,
    wherein the file location identifier is identifiable by the string in the file, the size of the first computer program is determinable from the file location identifier, and the location of the division between file first computer program and the second computer program in the file is determinable based on the size of the first computer program identified from the file location identifier; and
    storing the file in a contiguous set of memory locations in the memory, to contiguous set of memory locations including a consecutive set of memory locations in the memory.

17. The method of claim 16, further comprising steps of determining a memory address of a beginning of the second computer program based on the file location identifier; and
    extracting to second computer program from the memory.

18. The method of claim 17, wherein the file includes manageability firmware, and the first program includes a management processor interface program and the second program includes a resource program for facilitating access to the computing device over the Internet from a client device.

* * * * *

UNITED STATES PATENT AND TRADEMARK OFFICE
CERTIFICATE OF CORRECTION

PATENT NO. : 7,065,531 B2
APPLICATION NO. : 10/094646
DATED : June 20, 2006
INVENTOR(S) : John W. Hover It is certified that error appears in the above-identified patent and that said Letters Patent is hereby corrected as shown below:

In column 5, line 6, in Claim 1, delete "tile," and insert -- file, --, therefor.

In column 5, line 24, in Claim 2, delete "where" and insert -- wherein --, therefor.

In column 5, line 26, in Claim 2, delete "tile" and insert -- file --, therefor.

In column 5, line 28, in Claim 2, delete "tile" and insert -- file --, therefor.

In column 5, line 45, in Claim 6, delete "Including" and insert -- including --, therefor.

In column 6, line 3, in Claim 10, after "from" delete "to" and insert -- the --, therefor.

In column 6, line 7, in Claim 10, delete "onto" and insert -- on the --, therefor.

In column 6, line 7, in Claim 10, after "of" delete "to" and insert -- the --, therefor.

In column 6, line 8, in Claim 10, delete "to" before "file" and insert -- the --, therefor.

In column 6, line 28, in Claim 15, delete "aver" and insert -- over --, therefor.

In column 6, line 34, in Claim 16, after "including" delete "a," and insert -- a --, therefor.

In column 6, line 45, in Claim 16, after "between" delete "file" and insert -- the --, therefor.

In column 6, line 50, in Claim 16, after "memory," delete "to" and insert -- the --, therefor.

UNITED STATES PATENT AND TRADEMARK OFFICE
CERTIFICATE OF CORRECTION

PATENT NO.       : 7,065,531 B2                                          Page 2 of 2
APPLICATION NO.  : 10/094646
DATED            : June 20, 2006
INVENTOR(S)      : John W. Hover It is certified that error appears in the above-identified patent and that said Letters Patent is hereby corrected as shown below:

In column 6, line 53, in Claim 17, after "steps" delete "of" and insert -- of: --, therefor.

In column 6, line 57, in Claim 17, after "extracting" delete "to" and insert -- the --, therefor.

Signed and Sealed this

Third Day of March, 2009

JOHN DOLL
*Acting Director of the United States Patent and Trademark Office*